July 5, 1955
A. FOCHER
2,712,186
SCREW-TYPE DITCH CUTTING AND CLEANING MACHINE
Filed Nov. 13, 1951
2 Sheets-Sheet 2
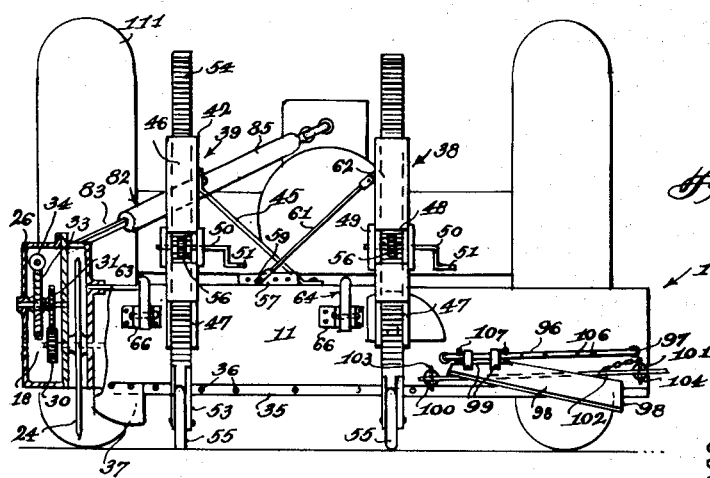
Fig. 3.
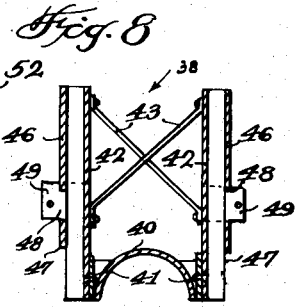
Fig. 8.
Fig. 7.
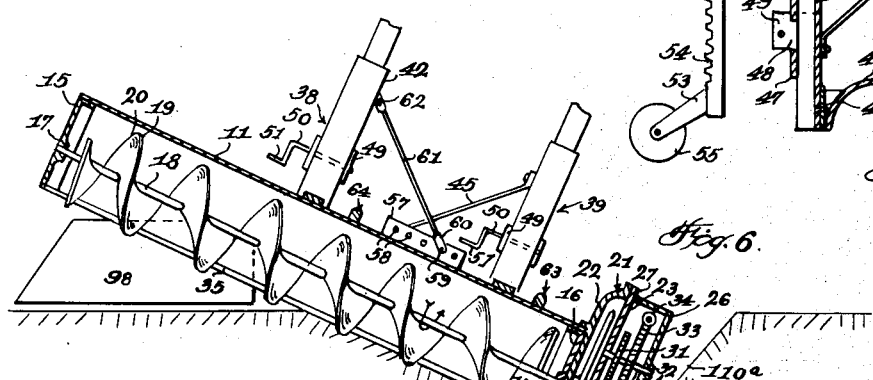
Fig. 6.
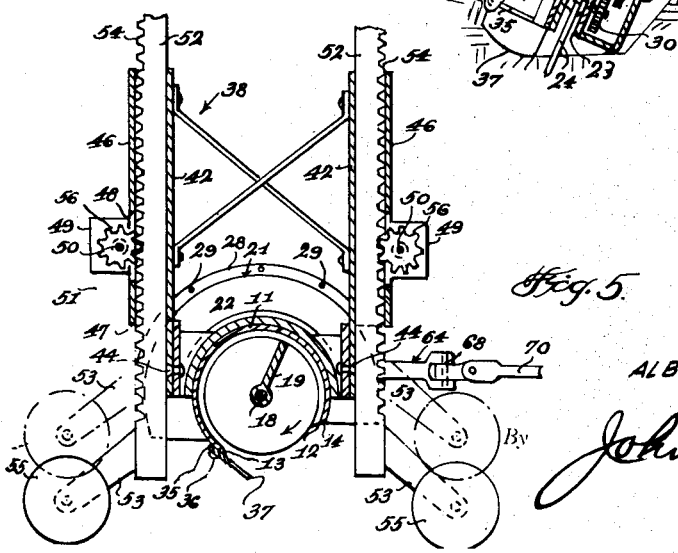
Fig. 5.
Inventor
ALBERT FOCHER
By John N. Randolph
Attorney

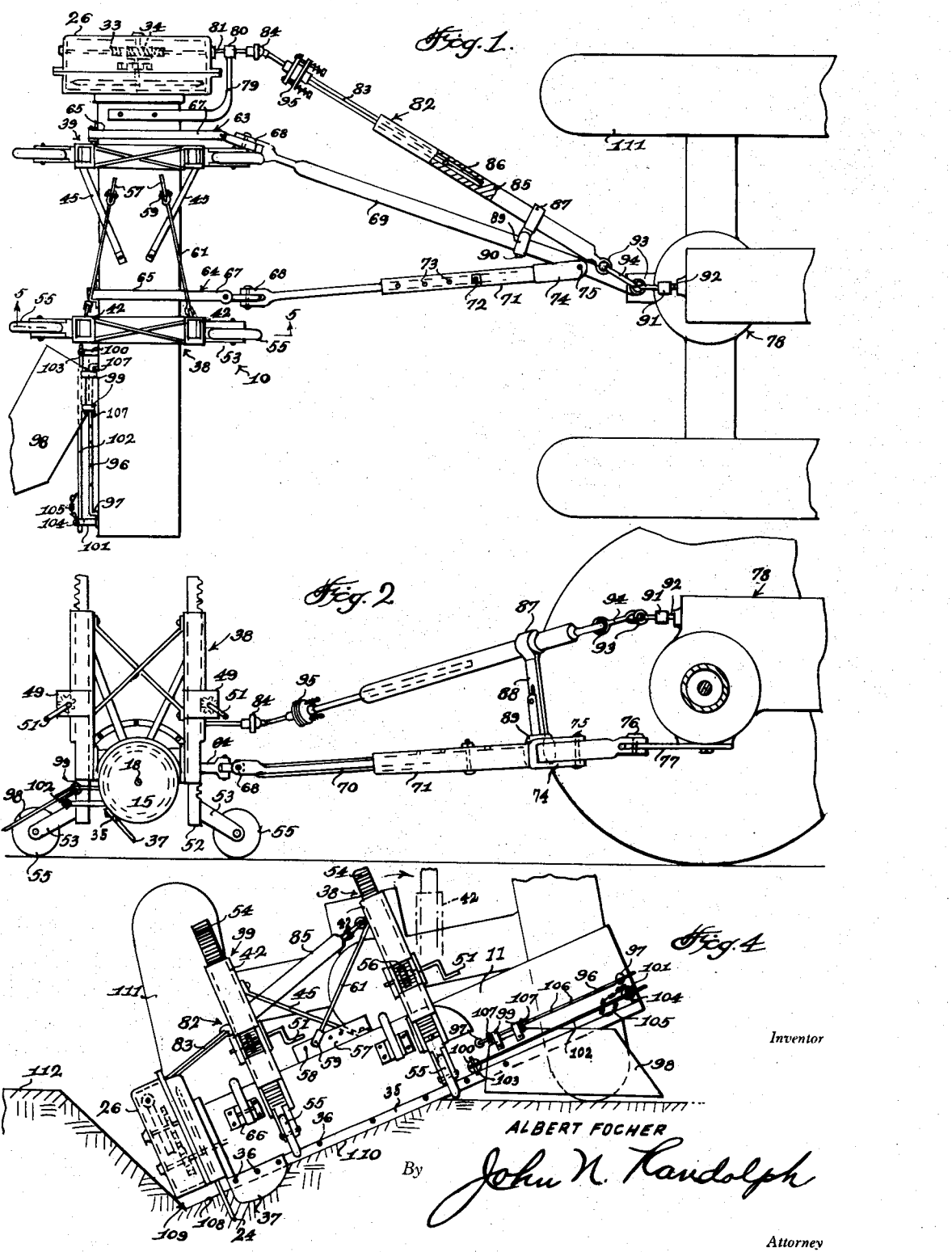

_____

United States Patent Office 2,712,186
Patented July 5, 1955

_____

2,712,186

SCREW-TYPE DITCH CUTTING AND CLEANING MACHINE

Albert Focher, Ballantine, Mont.

Application November 13, 1951, Serial No. 255,963

7 Claims. (Cl. 37—81)

This invention relates to a power driven ditcher particularly adapted for use in maintaining irrigation ditches and primarily intended for cleaning such ditches and which is likewise capable of cutting or recutting a ditch and reshaping a ditch.

More particularly, it is an aim of the present invention to provide a ditcher capable of cleaning or cutting one side of a ditch at a time and of conveying and discharging the material removed from the ditch on the ground surface above and beyond the side of the ditch being cleaned or cut.

Another object of the invention is to provide a ditch cleaner and cutter including a screw type conveyor for cutting and cleaning a ditch and for removing material therefrom, and which conveyor is driven in a direction to rotate or have a rolling action corresponding to the direction of movement of the ditcher to minimize the amount of draft required to propel the ditcher.

Still a further object of the invention is to provide a ditcher having a conveyor casing provided with means for scraping dirt and other foreign matter from the bottom of a ditch into a position to be removed from the ditch by the conveyor and including a blade portion disposed in a trailing relationship relatively to the cutting and conveying means for smoothing the bank of the ditch being cut or cleaned after the cutting and cleaning operation being performed in advance thereof.

Another object of the invention is to provide a power driven ditcher which will effectively remove silt, grass and other growths from a ditch bed and bank and which is provided with means to maintain one end of the ditcher in the bed of the ditch and to cause it to travel in a straight line relatively to the ditch when propelled therealong.

A further object of the invention is to provide novel supporting means for the ditcher which may be adjusted to accommodate the cutting and conveying parts to ditches having banks of different slopes or to support said parts in an elevated transport position when the ditcher is not in use.

A further object of the invention is to provide an adjustable hitch and drive shaft arrangement for adjusting the ditcher relatively to a draft vehicle and power source to enable the draft vehicle to travel in advance of the ditcher either in a position partially in the ditch or straddling the ditch while maintaining the ditcher at a proper working angle.

Various other objects and advantages of the invention will hereinafter become more fully apparent from the following description of the drawings, illustrating a presently preferred embodiment thereof, and wherein:

Figure 1 is a top plan view showing the ditcher as attached to a draft vehicle and in a transport position;

Figure 2 is a side elevational view thereof;

Figure 3 is a rear elevational view, partly in vertical section thereof;

Figure 4 is a rear elevational view showing the ditcher in an operative position for cleaning and cutting one-half of a ditch;

Figure 5 is an enlarged fragmentary vertical sectional view taken substantially along a plane as indicated by the line 5—5 of Figure 1;

Figure 6 is a longitudinal vertical sectional view partly in elevation taken longitudinally through the conveyor casing looking in the opposite direction to Figure 4 and showing the ditcher in an operative position;

Figure 7 is a vertical sectional view of a part of the supporting wheel structure of the ditcher, and Figure 8 is a side elevational view of another part thereof.

Referring more specifically to the drawings, the power driven ditching machine in its entirety is designated generally 10 and includes an elongated screw conveyor casing 11 of circular cross section except for the fact that the bottom portion of the casing 11 is provided with a relatively wide slot extending from end-to-end thereof. Slot 12 opens downwardly and forwardly since the rear or trailing edge thereof as defined by the longitudinal edge 13 of the casing is disposed below the level of the other edge 14 of the casing which defines the front wall of the slot. The ends of the casing 11 are closed by end walls 15 and 16 which are suitably secured in the ends of the cylindrical portion of the casing. Walls 16 are provided with aligned bearings 17 for journalling longitudinally spaced portions of a screw conveyor shaft 18 which is supported thereby axially of the casing 11. A screw conveyor or auger 19 is fixed to the shaft 18 and is disposed within the casing 11 concentrically thereof and for rotation therein. The auger or screw conveyor 19 is sufficiently large in diameter so that portions of each flight thereof project outwardly through the slot 12, as illustrated in Figures 5 and 6 and the edges of the flights or convolutions of the conveyor 19 are sharpened to form cutting edges 20, for a purpose which will hereinafter become apparent.

A colter wheel housing 21 has an inner wall 22 which is disposed around and secured to the end of the casing 11 which is closed by the end wall 16. The said colter housing has an outer wall 23 which is spaced outwardly from the end wall 16 and the inner wall 22. Shaft 18 extends through the walls 16, 22 and 23. A colter wheel 24 is fixed to the shaft 18 and disposed within the housing 21 and has a portion thereof projecting outwardly through the open bottom of the colter housing 21, as best seen in Figures 3 and 6. The outer wall 23 also forms the inner wall of a gear housing 26, a flanged edge 27 of which is secured to the flanged periphery 28 of the housing 21 by circumferentially spaced detachable fastenings 29, as seen in Figure 5. One end of the shaft 18 projects from the colter wheel 24 into the gear housing 26 and has a pinion 30 fixed thereto which meshes with a gear 31 which is fixed to a shaft 32. One end of the shaft 32 is journalled in the wall 23 and the opposite end thereof is journalled in the outer wall of the housing 26. A worm wheel 33 is fixed to the shaft 32 and meshes with a worm 34 which is disposed in the housing 26 above said worm wheel by means of which the worm wheel and gear 31 are driven for driving the pinion 30 and shaft 18, as will hereinafter be described in detail.

A replaceable cutting blade 35 is secured by fastenings 36 to the outer side of the lower portion of the casing 11 so that the cutting edge of the blade 35 extends below the edge 13. The blade 35 extends from the end of the slot adjacent the end wall 15 to a point near to but spaced from the opposite end of the slot. A replaceable point 37 is secured by additional fastenings 36 to the bottom rear portion of the casing 11 between the last mentioned end of the blade 35 and the last mentioned end of the slot 12 and said point 37 extends downwardly substantially below the cutting edge of the blade 35 and is shaped as best illustrated in Figures 3 and 6 to cut and clean the bottom portion of an irrigated ditch and to throw dirt, silt, grass and other matter upwardly from the ditch bottom through the slot 12 into the casing 11.

A pair of wheel supporting bracket units, designated generally 38 and 39 are mounted on and extend upwardly from longitudinally spaced portions of the casing 11 and each includes an arcuately shaped strap member 40 which is suitably secured around the upper half of a part of the casing 11. The members 40 have upright parallel walls 41 secured to and rising from the ends thereof to which are secured upright sleeve members 42 of noncircular cross section. Each of the wheel supports 38 and 39 includes a pair of sleeve members 42 which are connected to one another by diagonal braces 43. The sleeve members 42 of the unit 39, which is located nearest the gear housing 26, are rigidly secured to the plates 41 whereas the sleeves 42 of the unit 38 are swingably connected to the plates or walls 41 by aligned rivets or other suitable fastenings 44, as best seen in Figure 5, so that the pair of sleeves 42 of the unit 38 may swing as a unit longitudinally of the casing 11. The sleeves of the unit 39 are additionally supported in perpendicular positions relatively to the casing 11 by diagonal braces 45 which are secured at one end to the casing 11 and at their opposite ends to the upper portion of the unit 39.

The outer walls 46 of the four sleeves 42 are provided with slotted lower ends 47 and each wall 46 is provided with an upper slot 48 disposed above and adjacent its slot 47. A pair of ears or brackets 49 is secured to and projects outwardly from each wall 46 and forms journals for a shaft 50. One end of each shaft 50 is provided with crank 51. The slots 48 are disposed between the ears of the pairs of ears 49.

A rack bar 52 of noncircular cross section is slidably and nonrotatably disposed in each sleeve 42 and has a wheel fork 53 extending downwardly and outwardly from adjacent its outer edge and beneath the teeth 54 of the rack bar which are disposed thereabove. Each fork 53 has a ground engaging wheel 55 journalled in its free end and said forks are disposed for movement into the slots 47 when the rack bars 52 are retracted or raised to elevate the wheels 55. A rachet wheel 56 is fixed to each shaft 50 between the ears 49 in which it is journalled and extends through the adjacent slot 48 to mesh with the teeth 54 of the associated rack bar 52 so that by turning the cranks 51 the wheels 55 may be individually raised and lowered and positioned at different elevations. If the frictional engagement between the ratchet wheels 56 and rack bars 52 is insufficient to maintain the rack bars in adjusted positions when the wheels 55 are supporting the casing 11, suitable latch means, not shown, may be provided to prevent turning movement of the ratchet wheels 56 and sliding movement of the rack bars 52 except when the cranks 51 are manually turned.

A pair of plates 57 are secured to circumferentially spaced portions of the upper side of the casing 11 and longitudinally thereof and have longitudinally spaced openings 58 to selectively receive a pin 59 which extends through a bifurcated end 60 of a brace 61. Two braces 61 are provided, having opposite upper ends pivotally connected at 62 one to each of the two sleeves 42 of the wheel supporting unit 38. The supporting unit 38 may be swung longitudinally of the casing 11 about its pivots 44 and retained in various angularly adjusted positions relatively to the axis of the casing 11 by positioning the pin 59 in the various plate openings 58.

A pair of rigid strap members 63 and 64 have corresponding upwardly bowed rear end portions 65 which engage over the upper rear portion of the casing 11 and are swingably connected thereto by hinges 66 for vertical swinging movement relatively to the casing 11. The strap member 63 is located near the end of the casing 11 on which the gear housing 26 is mounted and the strap member 64 is located intermediate of the ends of said casing. The said strap members have opposite forward ends 67 which extend forwardly from the casing 11.

The forward end of the member 63 is connected by a universal joint 68 to the rear end of a draft tongue 69 and the forward end of the other strap member 64 is connected by a second universal joint 68 to the rear end of a rod 70 the forward end of which telescopes into a sleeve 71 and to which it is adjustably connected by a pin 72 extending through selectively aligned openings 73 in said rod and sleeve to vary the length of the extensible coupling rod 70, 71 thus formed by the rod and sleeve. The sleeve 71 is provided with a bifurcated forward end 74 which is swingably connected to the tongue 69 by a pin 75, near the forward end of said tongue. The forward end of the tongue 69 is connected by a coupling pin 76 to a drawbar 77 which is secured to and extends rearwardly from a tractor or other draft vehicle 78.

An arm 79 is fastened to the upper side of the casing 11 and has a transversely offset end forming a bearing 80 which is disposed in front of the upper part of the housing 26 and in which is journalled a portion of a shaft 81 the rear part of which extends through the upper part of the housing 26 and is journalled in circumferentially spaced portions of the periphery of said housing. The worm 34 is fixed to a portion of the shaft 81 which is disposed in the housing 26. An extensible telescopic shaft 82 has a rear end formed by a rod of noncircular cross section, designated 83, the rear or distal end of which is connected by a universal joint 84 to the forward end of the shaft 81. The telescopic shaft 82 includes a forward female section 85 having an elongated longitudinally extending recess of noncircular cross section as seen at 86 in Figure 1 which opens outwardly of its rear end and in which the forward end of the rod 83 is slidably and nonturnably disposed. The shaft 85 is loosely journalled adjacent its forward end in a bearing 87 forming one end of a supporting arm 88 which may be formed of extensible sections, as illustrated in Figure 2 and which has a collar 89 at its opposite end which is adjustably secured on the tongue 69 by a fastening 90. A coupling element 91 is connected to the power takeoff shaft end 92 of the tractor 78 which projects from the rear end of said tractor and said coupling element 91 is preferably connected to the forward end of the shaft section 85 by spaced universal joints 93 between which a shaft portion 94 is interposed, whereby the shaft 81 will be driven by the power takeoff shaft 92 for driving the auger shaft 18 and auger 20 through the worm and gear drive contained in the housing 26. An automatic clutch 95 of any suitable construction may be provided in the shaft portion 83 to disengage the shaft 82 from the shaft 81 in the event of overloading of the shaft 81 by the parts driven thereby to prevent an excessive torque being transmitted to the power takeoff shaft 92.

A rod 96 has inturned ends 97 which are secured to the rear side of the casing 11. The rod 96 is disposed longitudinally of the casing 11 adjacent the end thereof remote from the gear housing 26. A tail board 98 has strap members secured at their ends to the tail board near one end thereof to form loops 99 which engage turnably and slidably on the rod 96. A pair of longitudinally spaced brackets 100 and 101 are fixed to and project outwardly from the casing 11 beneath and adjacent the ends of the rod 96. A bar 102 has one end pivotally connected by a pin 103 to the bracket 100 and is detachably connected at its opposite end to the bracket 101 by a pin 104 which extends through the said bracket 101 and through the bar 102 and which may be loosely attached by a chain 105 to the bar 102. The bar 102 is disposed beneath and substantially parallel to the rod 96 and is swingable outwardly from the casing 11 about its pivot 103. The tailboard 98 in an operative position extends downwardly from the rod 96 between the casing 11 and bar 102 and has its rear side bearing against said bar for maintaining the tailboard in substantially an upright, operative position below the casing 11 with its bottom edge disposed at an angle to the casing, as illustrated in Figure 4. By disengaging the bar 102 from the bracket 101, said bar may be swung outwardly to allow the tailboard 98 to be swung upwardly and said bar 102 may then be engaged beneath the tailboard to support it in an elevated, inoperative position, as illustrated in Figures 1 and 2. The rod 96 is provided with spaced openings 106 to receive pins or other fastenings which are selectively applied to said openings on the remote sides of the loops 99 for adjusting the tailboard 98 longitudinally of the casing 11 depending upon the depth and width of a ditch being cut or cleaned, as will hereinafter be described.

Assuming that the tongue 69 is coupled to the tractor drawbar 77 and that the extensible shaft 82 is connected to the power takeoff shaft 92, the housing 26 and the end of the casing 11 located adjacent thereto may be positioned in the bed portion 108 of an irrigation ditch, designated generally 109, so that the casing 11 will extend upwardly along one inclined bank 110 of the ditch 109. The tractor 78 may be positioned with one of its rear wheels 111 running in the ditch bed 108 and by adjusting the length of the connecting rod 70, 71, the casing may be positioned at a proper angle to the plane of the earth's surface 112 adjacent the ditch 109 and at a desired angle forwardly or rearwardly relatively to the longitudinal axis of the tractor 78. Likewise, if desired, the connecting rod 70, 71 may be adjusted to maintain the casing 11 in its angular position of Figures 4 and 6 while the tractor 78 is disposed to straddle the ditch 109 and is offset to the left of its position of Figure 4, by extending the connecting rod 70, 71. The supporting wheel structures 38 and 39 are then adjusted by turning the shafts 50 by their cranks 51 to displace the wheels 55 downwardly and so that the wheels 55 of the section 39 will contact the bank 110 in front of and behind the casing 11 while the wheels 55 of the structure 38 are displaced downwardly to contact the ground surface 112 beyond the bank 110. If necessary, the unit 38 may be swung to an angular position relatively to the axis of the casing 11, as previously described by adjustably positioning the braces 61 relatively to the plates 57 so that the wheels 55 of the unit 38 may properly engage and travel over the surface 112. It will also be readily apparent that the wheels disposed behind and in front of the casing 11 may be positioned different distances beneath the sleeve members 42 for tilting the slotted bottom 12 of the casing 11 either forwardly or rearwardly due to the fact that said casing has a hinged connection to the tongue 69 and to the connecting rod 70, 71 by the strap members 63 and 64, respectively, each of which strap members is hinged at 66 to the casing 11.

As the tractor 78 is propelled forwardly while its power takeoff shaft 92 is being driven, the cutting edges 20 of the auger or screw conveyor 19 will cut and scrape the bank 110 and the grass, silt and dirt picked up thereby will enter the casing 11 through the slot 12 and will be conveyed toward the elevated end of said casing and discharged through the portion of the slot 12 located adjacent the casing end wall 15 onto the ground surface 112 located beyond the bank 110 and in front of the tailboard 98 which will deflect this material, not shown, outwardly and away from the ditch 109. At the same time, the point 37 will scrape one half of the bed 108 of the ditch and the material scraped upwardly by said point will be picked up by the conveyor 19 and conveyed upwardly and discharged with the other material previously referred to. The colter wheel 24 will be driven in the same direction as the auger 19 and will revolve and roll forward in the same direction as the wheels of the tractor 78. The said colter wheel 24 will cut into a central portion of the ditch bed 108 and will prevent the ditching machine 10 from being displaced either to the left or right of its operative position in the ditch 109, as illustrated in Figures 4 and 6. The bottom cutting edge of the blade 35 is disposed to scrape and slightly cut the ditch bank 110 behind the auger 19 to leave a smooth surface behind the ditching machine 10, and material picked up thereby will likewise be deflected into the casing 11 through its slot 12 and will be conveyed by the auger 19 with the other material and discharged in front of the tailboard 98. The auger 19 likewise turns in a direction corresponding to the direction of movement of the machine 10 or clockwise, as illustrated in Figure 5 so that said auger and the colter wheel 24 will tend to propel the ditcher forwardly to minimize the draft or pull required to propel said ditcher.

It will also be readily apparent that the ditcher 10 will be similarly disposed to travel in the opposite direction relatively to the ditch 109 for similarly cutting and cleaning the other half of the ditch bed 108 and the other ditch bank 110a.

In transport position for moving the ditcher 10 to and from a ditch, all four of the wheels 55 are displaced downwardly equal distances for supporting the ditcher in an elevated substantially horizontal position, as illustrated in Figures 1, 2 and 3 and the tailboard 98 is supported by the bar 102 in its inoperative position. Ordinarily, the connecting rod 70, 71 will have to be adjusted in length when the ditcher 10 is disposed in a transport position.

Various modifications and changes are contemplated and may obviously be resorted to, without departing from the spirit or scope of the invention as hereinafter defined by the appended claims.

I claim as my invention:

1. A ditch cleaning and cutting machine comprising an elongated substantially cylindrical casing having a downwardly and forwardly opening slot formed in the bottom portion thereof, a driven screw conveyor and auger having a plurality of convolutions journaled in said casing and having a portion of each convolution thereof projecting downwardly from the casing through its slotted bottom, adjustable draft means pivotally connected to and extending forwardly from the casing and adapted to be coupled to a draft vehicle for pulling the ditcher behind the draft vehicle and for maintaining the casing with its longitudinal axis substantially crosswise to the longitudinal axis of the draft vehicle, articulate means forming a part of the draft means and permitting vertical endwise rocking movement of said casing relative to the draft vehicle, said casing being disposed at an incline transversely of a ditch and having a lower end thereof disposed in the bed of the ditch and an opposite upper end disposed above and to one side of the ditch, said driven screw conveyor and auger feeding toward the upper end of the casing for scraping and cutting one bank of the ditch and for conveying the material therefrom toward the upper end of the casing to discharge it through said slotted bottom adjacent the upper casing end and at one side of the ditch as the ditcher is pulled behind the draft vehicle, a cutting point fixed to and depending from the casing adjacent its first mentioned lower end and extending downwardly from the casing portion defining the trailing or rear end of said slotted bottom for cutting and cleaning a part of the ditch bed and for deflecting the cut and scraped material therefrom upwardly into the casing to be conveyed toward the upper end thereof by the screw conveyor, a colter wheel housing secured to the first mentioned casing end and having an open bottom, and a colter wheel connected to the screw conveyor and auger and rotatably disposed in the colter wheel housing and having a bottom portion depending therefrom to below said cutting point and traveling in the ditch bed for retaining the ditcher against lateral displacement relative to the ditch.

2. A ditch cleaning and cutting machine as in claim 1, said draft means including a plurality of strap members disposed over the upper portion of the casing and spaced longitudinally with respect to one another, said strap members being pivotally connected to a rear portion of the casing and forming the rear end of the draft means for permitting the casing to be turned about its longitudinal axis for variably canting said slotted casing bottom.

3. A ditch cleaning and cutting machine comprising an elongated substantially cylindrical casing having a downwardly and forwardly opening slot formed in the bottom portion thereof, a driven screw conveyor and auger having a plurality of convolutions journaled in said casing and having a portion of each convolution thereof projecting downwardly from the casing through its slotted bottom, adjustable draft means pivotally connected to and extending forwardly from the casing and adapted to be coupled to a draft vehicle for pulling the ditcher behind the draft vehicle and for maintaining the casing with its longitudinal axis substantially crosswise to the longitudinal axis of the draft vehicle, articulate means forming a part of the draft means and permitting vertical endwise rocking movement of said casing relative to the draft vehicle, said casing being disposed at an incline transversely of a ditch and having a lower end thereof disposed in the bed of the ditch and an opposite upper end disposed above and to one side of the ditch, said driven screw conveyor and auger feeding toward the upper end of the casing for scraping and cutting one bank of the ditch and for conveying the material therefrom toward the upper end of the casing to discharge it through said slotted bottom adjacent the upper casing end and at one side of the ditch as the ditcher is pulled behind the draft vehicle, said draft means including a rear part having portions hingedly connected to longitudinally spaced parts of the casing and additionally including a forwardly extending tongue coupled at its forward end to the draft vehicle and having a universal joint adjacent its rear end and an extensible connecting rod connected to one of said rear end portions of the draft means and swingably connected at its forward end to a forward portion of the tongue, said connecting rod having a universal joint connection at its rear end and being formed of adjustably connected telescopic sections for angularly adjusting the axis of the casing relatively to the axis of the draft vehicle.

4. A ditch cleaning and cutting machine as in claim 3, and a supporting wheel structure including spaced wheel units mounted on and secured to the casing in longitudinally spaced relation to one another and having wheels disposed below the bottom portion of the casing adapted to engage a bank of a ditch and the ground surface adjacent thereto for supporting the casing at an incline.

5. A ditch cleaning and cutting machine as in claim 4, each of said wheel units including a front wheel and a rear wheel disposed forwardly of and behind the casing, respectively.

6. A ditch cleaning and cutting machine as in claim 5, and means for individually extending and retracting each wheel of the supporting wheel structure downwardly and upwardly, respectively, for varying the cutting depth of the auger and for tilting the casing longitudinally and transversely.

7. A ditch cleaning and cutting machine as in claim 6, one of said wheel units being swingably mounted on the casing for swinging movement longitudinally thereof for adjustably positioning the wheels of said unit longitudinally of the casing, and adjustable brace means for retaining said last mentioned wheel unit in various angular adjusted positions relative to the axis of the casing.

References Cited in the file of this patent

UNITED STATES PATENTS

| Number | Name | Date |
|---|---|---|
| 973,402 | Barnett | Oct. 18, 1910 |
| 1,410,585 | McCall | Mar. 28, 1922 |
| 1,462,785 | Canion | July 24, 1923 |
| 1,721,392 | Neumann | July 16, 1929 |
| 1,831,324 | Seward | Nov. 10, 1931 |
| 1,870,591 | Saxon | Aug. 9, 1932 |
| 1,910,120 | Mowbray | May 23, 1933 |
| 1,993,282 | Porter | Mar. 5, 1935 |
| 2,148,568 | McBrady | Feb. 28, 1939 |
| 2,199,239 | Griffith et al. | Apr. 30, 1940 |
| 2,437,116 | Oppegaard | Mar. 2, 1948 |

FOREIGN PATENTS

| 614,144 | Great Britain | Dec. 9, 1948 |